(12) United States Patent
Schilke et al.

(10) Patent No.: US 10,369,720 B2
(45) Date of Patent: *Aug. 6, 2019

(54) STACKED ROLLING VEHICLE TRACK

(71) Applicant: Rocky Mountain Coasters, Inc., Hayden, ID (US)

(72) Inventors: Alan Schilke, Hayden, ID (US); Fred Grubb, Hayden, ID (US)

(73) Assignee: Rocky Mountain Coasters, Inc., Hayden, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,561

(22) Filed: Aug. 4, 2017

(65) Prior Publication Data

US 2018/0085968 A1  Mar. 29, 2018

Related U.S. Application Data

(63) Continuation of application No. 14/375,022, filed as application No. PCT/US2013/032653 on Mar. 15, 2013, now Pat. No. 9,821,490.

(Continued)

(51) Int. Cl.
  *B32B 7/08* (2019.01)
  *B29C 65/00* (2006.01)
  (Continued)

(52) U.S. Cl.
  CPC .............. *B27M 3/00* (2013.01); *A63G 7/00* (2013.01); *B29C 65/483* (2013.01);
  (Continued)

(58) Field of Classification Search
  CPC .......... A63G 7/00; A63G 21/04; A63G 21/20; A63G 21/00; E01B 25/00; E01B 25/08;
  (Continued)

(56) References Cited

U.S. PATENT DOCUMENTS 9,755 A * 5/1853 Middleton .............. E01B 25/28
  238/129
1,340,454 A * 5/1920 McClenahan ............. E01B 5/08
  238/134

(Continued)

FOREIGN PATENT DOCUMENTS

CN  200 939 341 Y  8/2007
CN  201279386  7/2009

(Continued)

OTHER PUBLICATIONS

Preliminary Report on Patentability in PCTUS2013032653.

(Continued)

*Primary Examiner* — Philip C Tucker
*Assistant Examiner* — Brian R Slawski
(74) *Attorney, Agent, or Firm* — Pizarro Allen PC

(57) ABSTRACT

A roller coaster track may comprise a laminate and a metal bearing layer. A method of manufacturing a roller coaster track may comprise manufacturing a laminate, manufacturing a metal bearing layer, and assembling the laminate and bearing layer. The bearing layer may be at least partially filled with grout. A method of repairing a wood roller coaster track may comprise removing a layer of laminate, and replacing the layer with a metal bearing layer.

4 Claims, 18 Drawing Sheets

Related U.S. Application Data

(60) Provisional application No. 61/623,521, filed on Apr. 12, 2012.

(51) Int. Cl.

| | | |
|---|---|---|
| B32B 37/00 | (2006.01) | |
| B32B 38/04 | (2006.01) | |
| C09J 163/00 | (2006.01) | |
| A63G 1/00 | (2006.01) | |
| A63G 7/00 | (2006.01) | |
| A63G 21/00 | (2006.01) | |
| A63G 29/00 | (2006.01) | |
| E01B 5/00 | (2006.01) | |
| E01B 13/00 | (2006.01) | |
| B27M 3/00 | (2006.01) | |
| B29C 65/48 | (2006.01) | |
| B29C 65/72 | (2006.01) | |
| B29C 65/56 | (2006.01) | |

(52) U.S. Cl.
CPC .......... B29C 65/564 (2013.01); B29C 65/72 (2013.01); B29C 66/30341 (2013.01); B29C 66/438 (2013.01); B29C 66/4326 (2013.01); B29C 66/45 (2013.01); B29C 66/72329 (2013.01)

(58) Field of Classification Search
CPC .......... E01B 25/10; E01B 25/22; E01B 25/24; E01B 26/00; E01B 5/00; E01B 5/02; E01B 5/08; E01B 9/68; E01B 9/681; E01B 9/683; E01B 25/02; E01B 25/04; E01B 25/14; B29C 65/00; B29C 65/48; B29C 65/483; B29C 65/4835; B29C 65/56; B29C 65/562; B29C 65/564; B29C 65/72; B29C 66/00; B29C 66/30341; B29C 66/45; B29C 66/4326; B29C 66/438; B29C 66/72329; B29C 66/022; B29C 66/02241; B27M 3/00; B27M 3/0013; B27M 3/0073; B27M 3/0086; B27M 3/002; B27M 3/14
USPC .. 156/60, 71, 91, 92, 94, 98, 196, 199, 200, 156/201, 242, 244.11, 244.13, 250, 252, 156/256, 292, 304.1, 304.2, 330; 104/53, 104/106, 111, 118, 119; 238/122, 125, 238/130, 134, 149, 150
See application file for complete search history.

(56) References Cited

U.S. PATENT DOCUMENTS

| | | | |
|---|---|---|---|
| 1,454,760 A * | 5/1923 | Neary | A63G 7/00 104/246 |
| 1,501,060 A | 7/1924 | Miller | |
| 1,621,337 A * | 3/1927 | Schmeck | A63G 7/00 104/248 |
| 1,741,286 A | 12/1929 | Church | |
| 1,755,030 A | 4/1930 | Schmeck | |
| 1,881,151 A * | 10/1932 | Traver | A63G 7/00 104/53 |
| 3,217,659 A | 11/1965 | Ford, Jr. | |
| 3,225,703 A | 12/1965 | Lemcke | |
| 3,403,633 A | 10/1968 | Schwarzkopf | |
| 4,208,969 A | 6/1980 | Baltensperger et al. | |
| 4,274,336 A | 6/1981 | Pater et al. | |
| 4,429,845 A | 2/1984 | Stover et al. | |
| 4,752,011 A | 6/1988 | Pudney | |
| 5,175,405 A | 12/1992 | Karimine et al. | |
| 5,291,834 A | 3/1994 | Quaas | |
| 5,687,649 A | 11/1997 | Koeninger et al. | |
| 6,263,800 B1 | 7/2001 | Wilson | |
| 7,047,888 B2 | 5/2006 | Richards | |
| 7,131,382 B2 | 11/2006 | Gordon | |
| 8,117,968 B2 | 2/2012 | Rose et al. | |
| 2001/0003261 A1* | 6/2001 | Stengel | A63G 7/00 104/53 |
| 2005/0274275 A1 | 12/2005 | Gordon | |
| 2006/0137563 A1 | 6/2006 | Cummins | |
| 2009/0114114 A1 | 5/2009 | Rose et al. | |
| 2009/0230205 A1* | 9/2009 | Hepner | E01B 25/08 238/2 |
| 2010/0310893 A1 | 12/2010 | Derbyshire et al. | |
| 2011/0146528 A1 | 6/2011 | Schilke et al. | |

FOREIGN PATENT DOCUMENTS

| | | | |
|---|---|---|---|
| DE | 326 161 C | 9/1920 | |
| GB | 190929763 A * | 7/1910 | ............... E01B 5/08 |
| GB | 191122976 A * | 8/1912 | ............... E01B 25/24 |
| GB | 1111109 A * | 4/1968 | ............. E01B 25/10 |
| KR | 20070107666 | 6/2007 | |

OTHER PUBLICATIONS

Search Report and Written Opinion of ISR in PCTUS2013032653.
English Translation of first Office Action issued in Chinese Application for Invention No. 201380010298.8 dated Nov. 23, 2015 (8 pages).
Applicant correspondence to foreign associate regarding Response to first Office Action issued in Chinese Application for Invention No. 201380010298.8 dated Nov. 23, 2015 dated Mar. 9, 2016 (7 pages).
Foreign associate correspondence to Applicant confirming filing and enclosing Response as filed to first Office Action issued in Chinese Application for Invention No. 201380010298.8 dated Nov. 23, 2015 dated Mar. 16, 2016 (12 pages).
English Translation of second Office Action issued in Chinese Application for Invention No. 201380010298.8 dated Apr. 28, 2016 (5 pages).
Applicant correspondence to foreign associate regarding Response to second Office Action issued in Chinese Application for Invention No. 201380010298.8 dated Apr. 28, 2016 dated Aug. 25, 2016 (7 pages).
Foreign associate correspondence to Applicant confirming filing and enclosing Response as filed to second Office Action issued in Chinese Application for Invention No. 201380010298.8 on Apr. 28, 2016 dated Sep. 13, 2016 (14 pages).
English Translation of third Office Action issued in Chinese Application for Invention No. 201380010298.8 dated Oct. 24, 2016 (8 pages).
Applicant correspondence to foreign associate regarding Response to third Office Action issued in Chinese Application for Invention No. 201380010298.8 on Oct. 24, 2016 dated Dec. 12, 2016 (2 pages).
Foreign associate correspondence confirming filing and enclosing Response as filed to third Office Action issued in Chinese Application for Invention No. 201380010298.8 on Oct. 24, 2016 dated Jan. 9, 2017 (8 pages).
European search report issued in counterpart Application No. EP 13 77 4998 dated Dec. 4, 2015 (5 pages).
Examination report issued by the Korean Intellectual Property Office in counterpart Application No. UAE/P/1088/2014 (17 pages).
English translation of KR20070107666A (Foreign Patent Document No. 1) downloaded from https://patents.google.com/patent/KR20070107666A/en on Jan. 11, 2018 (11 pages).
English translation of CN201279386Y (Foreign Patent Document No. 2) downloaded from https://patents.google.com/patent/CN201279386Y/en on Jan. 11, 2018 (6 pages).
English translation of DE326161C (Foreign Patent Document No. 3) downloaded from https://worldwide.espacenet.com on Jan. 11, 2018 (6 pages).

(56) References Cited

OTHER PUBLICATIONS

English translation of CN200939341Y (Foreign Patent Document No. 4) downloaded from https://patents.google.com/patent/CN200939341Y/en on Jan. 11, 2018 (8 pages).

* cited by examiner

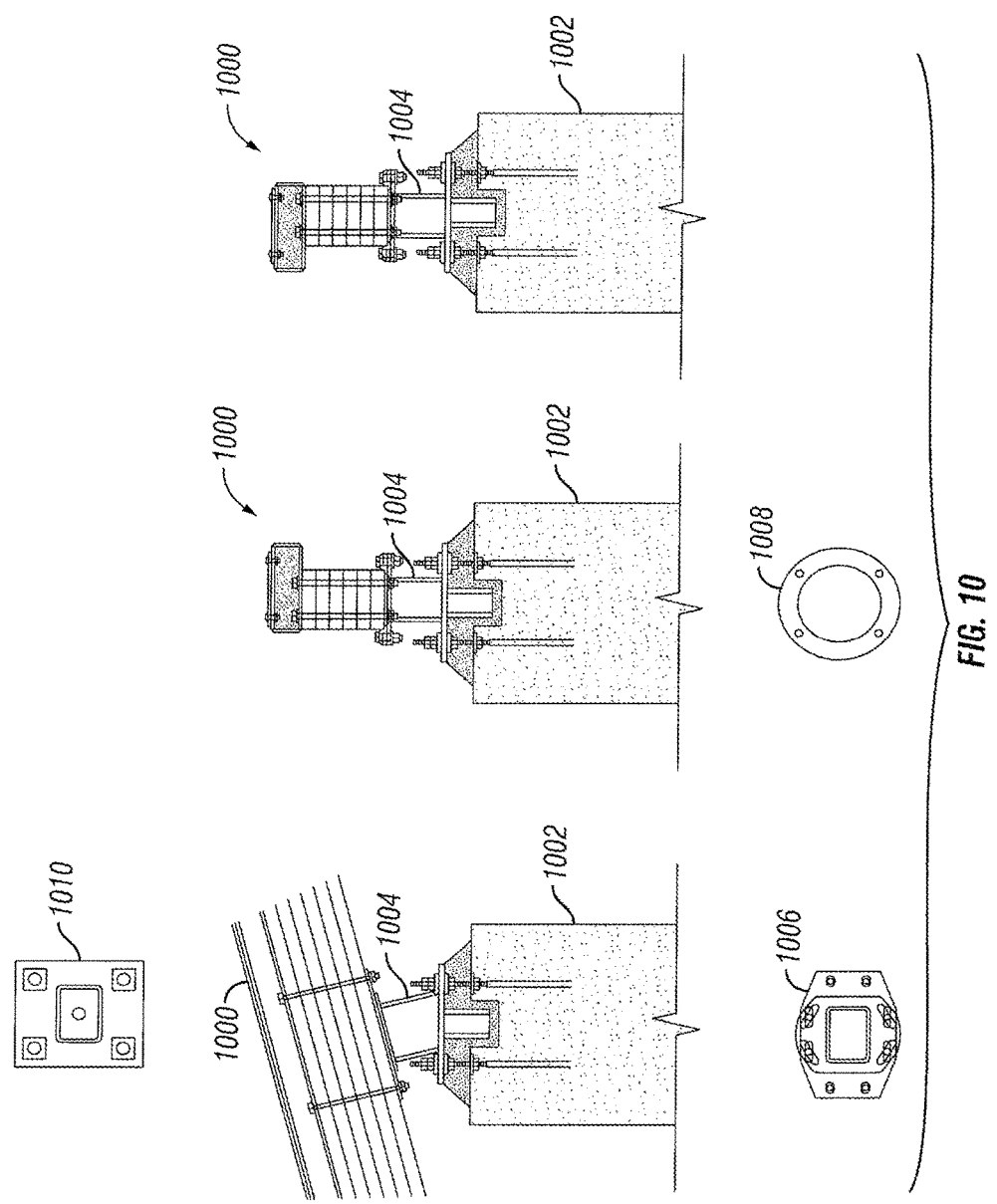

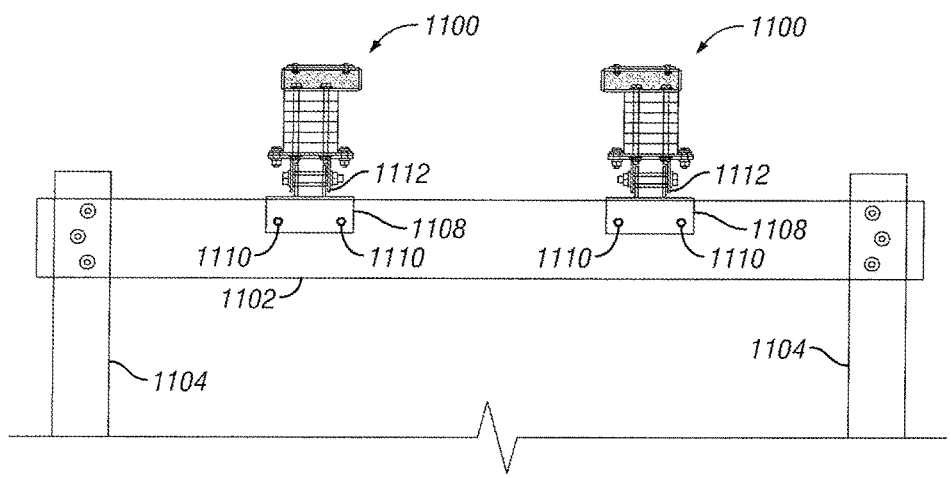
FIG. 11A
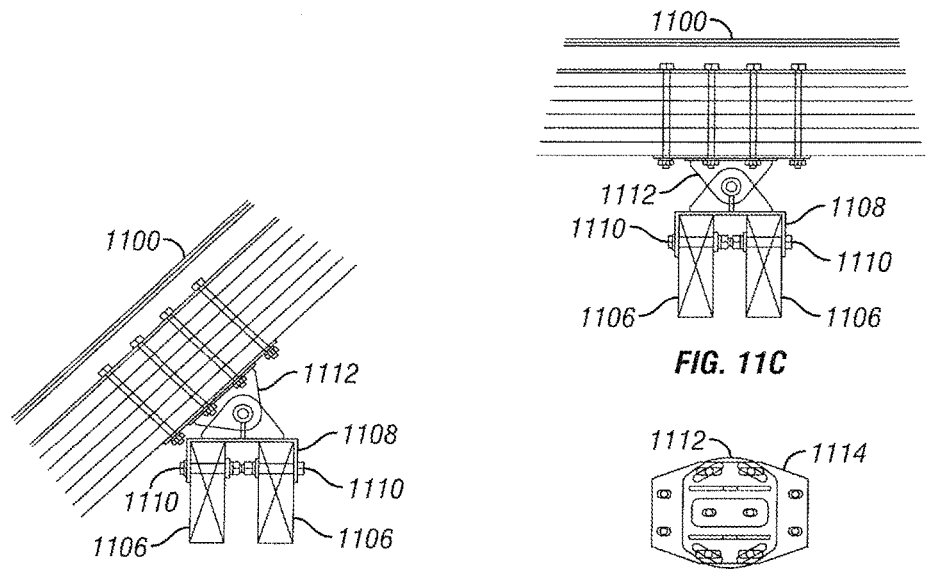
FIG. 11B
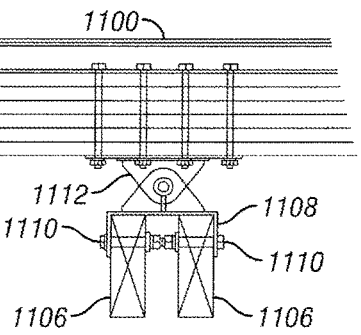
FIG. 11C
FIG. 11D

STACKED ROLLING VEHICLE TRACK

CROSS-REFERENCE TO RELATED APPLICATION

This application is a Continuation of U.S. patent application Ser. No. 14/375,022, entitled "STACKED ROLLING VEHICLE TRACK," filed Jul. 28, 2014, now U.S. Pat. No. 9,821,490, which is a US National Stage Application claiming priority to PCT Patent Application Serial No. PCT/US2013/032653, entitled "STACKED ROLLING VEHICLE TRACK," filed Mar. 15, 2013, which claims priority to U.S. Provisional Patent Application No. 61/623,521, entitled "STACKED ROLLING VEHICLE TRACK," filed Apr. 12, 2012, the disclosures of which are wholly incorporated herein by reference.

FIELD

The disclosed methods and apparatuses pertain to track for rolling vehicles, and particularly to track for roller coasters. The disclosed methods and apparatuses further pertain to structures comprising rails or other elongate, curved forms, such as amusement park rides, ski lifts, stair cases, rail-bound vehicle systems, and the like.

BACKGROUND

Track, rails and other elongate, curved forms constructed entirely or primarily from wood or other non-metallic material require regular maintenance. Construction of such structures typically involves multiple layers of such material, e.g., wood. For example, two or more wood layers may be laminated together to form a track, such as a roller coaster track. Such tracks are often viewed as desirable for a variety of reasons, such as availability of construction materials, design flexibility, an enhanced dynamic ride experience or simple nostalgia for older-style structures.

Typically, certain layers of wood receive substantially more wear than other layers, and requires more frequent repair or replacement. For example, wooden roller coaster track and wooden rails used for vehicle travel may have a top layer of wood upon which a roller coaster or train car wheel may travel. The top layer(s) may thus require more frequent repair or replacement as it wears from use. Other layers may sustain damage at track anchor points, or sustain environmental damage, e.g., from rain, temperature changes and other environmental forces.

Replacement of laminated layers typically results in structural damage to the track or rail as worn or damaged layers are removed and replaced. Adhesives, mechanical fasteners, hardware and coatings may need to be removed and re-applied or re-installed, thus degrading the structure over time.

There remains a need for laminated track, rails and other elongate, curved forms that comprise one or more non-wood layers to provide much greater durability, strength, improved dynamic experience in use, and provide cost savings over such laminated structures that require more frequent repair or replacement.

SUMMARY

A method of manufacturing a section of roller coaster track, the method comprising the steps of: creating a design of a curve of the roller coaster track section comprising a laminate and a bearing layer, the bearing layer comprising metal, the bearing layer further comprising a cross-section substantially in the shape of a first parallelogram, the first parallelogram comprising a first side, a second side, a third side and a fourth side, the design comprising a first design element corresponding to the first side, a second design element corresponding to the second side, a third design element corresponding to the third side, and a fourth design element corresponding to the fourth side; for each of the first design element, the second design element, the third design element and the fourth design element: determining a planar shape of the side, the planar shape of the side corresponding to such design element as laid flat, and cutting planar material into the form of the planar shape of the side so as to form the side; and assembling the cut planar material corresponding each of the design elements to form the bearing layer substantially according to the design; laminating at least two strips of non-metal material together to form the laminate substantially according to the design; and assembling the laminate and the bearing layer to form the curve of the roller coaster track section.

A method of repairing a roller coaster track section comprising laminate having at least two layers of wood, the method comprising the steps of: removing at least one layer of wood from the laminate; creating a design of a bearing layer substantially in a curve of the roller coaster track section, the bearing layer comprising metal, the bearing layer further comprising a cross-section substantially in the shape of a first parallelogram, the first parallelogram comprising a first side, a second side, a third side and a fourth side, the design comprising a first design element corresponding to the first side, a second design element corresponding to the second side, a third design element corresponding to the third side, and a fourth design element corresponding to the fourth side; for each of the first design element, the second design element, the third design element and the fourth design element: determining a planar shape of the side, the planar shape of the side corresponding to such design element as laid flat, and cutting planar material into the form of the planar shape of the side so as to form the side; and assembling the cut planar material corresponding each of the design elements to form the bearing layer substantially according to the design; and assembling the bearing layer together with the laminate such that the bearing layer substantially replaces at least one removed layer.

A method of repairing a roller coaster track comprising laminate having at least two layers of wood, the method comprising the steps of: creating a design of a bearing layer substantially in a curve of the roller coaster track section, the bearing layer comprising metal, the bearing layer further comprising a cross-section substantially in the shape of a first parallelogram, the first parallelogram comprising a first side, a second side, a third side and a fourth side, the design comprising a first design element corresponding to the first side, a second design element corresponding to the second side, a third design element corresponding to the third side, and a fourth design element corresponding to the fourth side; for each of the first design element, the second design element, the third design element and the fourth design element: determining a planar shape of the side, the planar shape of the side corresponding to such design element as laid flat, and cutting planar material into the form of the planar shape of the side so as to form the side; and assembling the cut planar material corresponding each of the design elements to form the bearing layer substantially according to the design; and assembling the bearing layer together with the laminate.

A method of manufacturing a curved roller coaster track section, the method comprising the steps of: creating a bearing layer, the bearing layer comprising metal; and assembling the bearing layer with laminate to form the curved roller coaster track section.

A method of splicing at least two roller coaster track sections, the method comprising the steps of: manufacturing or repairing a first section of roller coaster track according to one of the foregoing methods, wherein the laminate of the first section ("first laminate") and the bearing layer of the first section ("first bearing layer") each have a first end and a second end, and are assembled such that the first end of the first bearing layer extends beyond the first end of the first laminate; manufacturing or repairing a second section of roller coaster track according to the method of claim 1, wherein the laminate of the second section ("second laminate") and the bearing layer of the second section ("second bearing layer") each have a first end and a second end, and are assembled such that the second end of the second laminate extends beyond the second end of the second bearing layer by substantially the same length that the first end of the first bearing layer extends beyond the first end of the first laminate; and assembling the first section of roller coaster track with the second section of roller coaster track such that the first end of the first bearing layer substantially abuts the second end of the second bearing layer to create a bearing layer splice, and the first end of the first laminate substantially abuts the second end of the second laminate to create a laminate splice, the resulting bearing layer splice and the resulting laminate splice being offset.

A section of roller coaster track produced by one of the foregoing methods.

A roller coaster track comprising: laminate having at least two layers; a bearing layer assembled with the laminate, the bearing layer comprising metal. The roller coaster track may comprise wood layers. The roller coaster track may comprise a wear plate. The roller coaster track may comprise grout at least partially filling the bearing layer. The roller coaster track may comprise the bearing layer adhered to the laminate using epoxy. The roller coaster track may comprise the bearing layer being substantially wider than the laminate. The roller coaster track may comprise the bearing layer being at least 2½ inches wider than the laminate.

A roller coaster track comprising: a first track section comprising first laminate having at least two layers and a first metal bearing layer, wherein a first end of the first metal bearing layer extends beyond a first end of the first laminate; and a second track section comprising second laminate having at least two layers and a second metal bearing layer, wherein a second end of the second laminate extends beyond a second end of the second metal bearing layer by substantially the same amount that the first end of the first metal bearing layer extends beyond a first end of the first laminate; wherein the first track section and second track section are assembled so that the first end of the metal bearing layer substantially abuts the second end of the second metal bearing layer, and the first end of the first laminate substantially abuts the second end of the second metal bearing layer.

BRIEF DESCRIPTION OF THE DRAWINGS

FIG. 10 illustrates an embodiment of pillars for installing roller coaster track.
FIG. 11A-H illustrates another embodiment of ties for installing roller coaster track.

DETAILED DESCRIPTION

The methods and apparatuses are disclosed herein in connection with an exemplary embodiment, namely, track for a roller coaster. However, those having ordinary skill in the art will recognize that the disclosed methods and apparatuses may similarly apply to track for other types of rolling vehicles, as well as to structures comprising rails, architectural designs, or other elongate, curved forms, such as amusement park rides, ski lifts, stair cases, rail-bound vehicle systems, alpine slides, water park rides, and the like. Likewise, disclosed methods and apparatuses may be used for other people movers, such as motorized or non-motorized walkways, trams, escalators, and the like.

Figure 1:
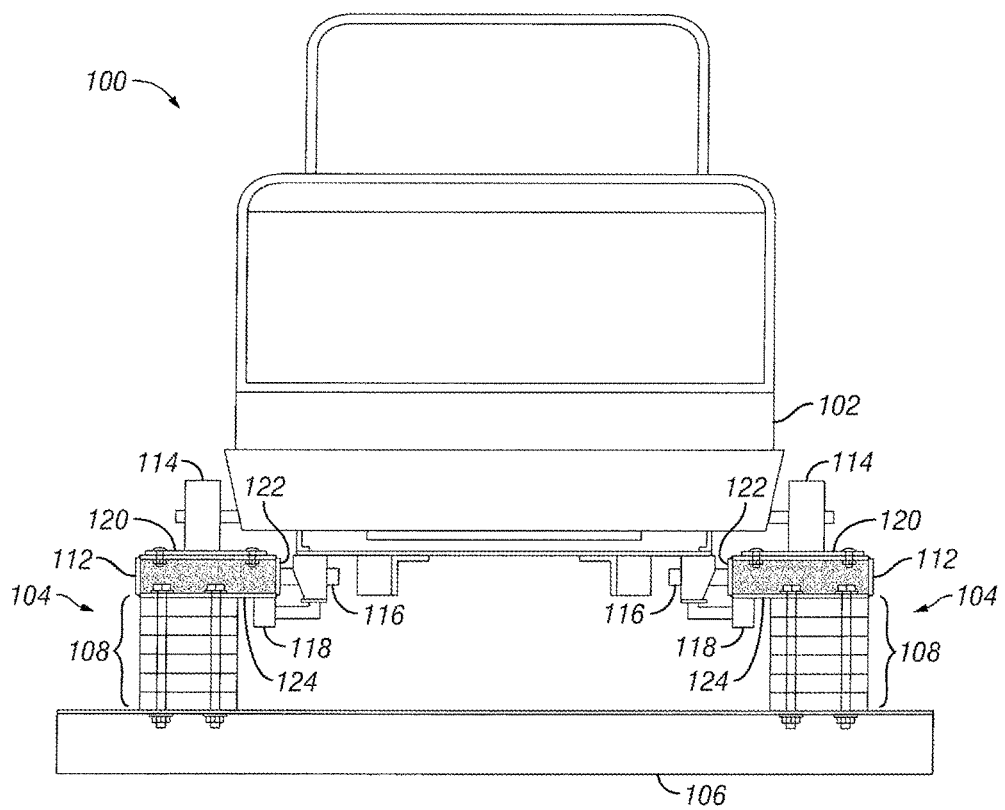
FIG. 1 illustrates an embodiment of a roller coaster.

In the embodiment of FIG. 1, a roller coaster 100 may include a car 102 mounted to tracks 104. The tracks 104 may be mounted to any suitable foundation 106. The tracks 104 may comprise laminate 108 and a bearing layer 112.

The bearing layer 112 may be mounted to the wood laminate 108. In the embodiment of FIG. 1, the bearing layer 112 is wider than the wood laminate 108, and the extra width extends toward the opposite track. For example, the bearing layer 112 may be approximately 3⅛" wider than the wood laminate 108, and extend beyond the wood laminate 108 by that much. Such a configuration may allow for mounting of a roller coaster car 102 to the tracks 104 so as to prevent the car 102 from losing contact with the tracks 104. Such a configuration may permit the roller coaster track 104 to include a wide variety of two-dimensional and three-dimensional curves along its length, such as turns, bends, loops, rolls and spirals. To mount the car 102 in such a fashion, the car 102 may be equipped with three wheels 114, 116 and 118 mountable to each track 104. Main wheels 114 may contact the upper surface 120 of the bearing layer 112, and allow the car 102 to rest and move on the tracks 104 while the car 102 is in an upright position. Lateral wheels 116 may contact the inner surface 122 of the bearing layer 112, and allow the car 102 to travel through curves at a speed at which the car 102 would slide off of the rails due to centripetal force if the wheels 116 were not present. Bottom wheels 118 may contact the under surface 124 of the bearing layer 112, and allow the car 102 to travel upside down without disengaging from the tracks 104.

Figure 2A:
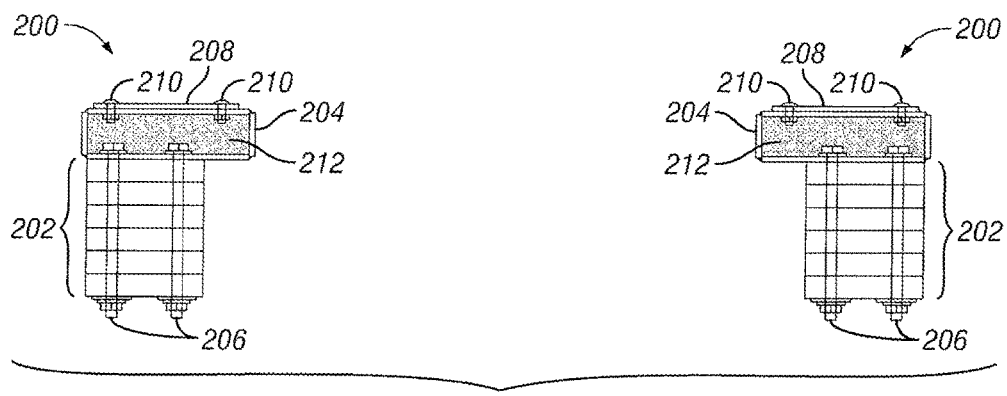
FIG. 2A-I illustrates various embodiments of roller coaster track.

The tracks may be embodied in a variety of ways. As may be seen in the embodiment of FIG. 2A, for example, the tracks 200 may comprise wood laminate 202 and bearing layer 204. The bearing layer 204 may be removably affixed to the wood laminate 202 by one or more bolts 206. In the embodiment of FIG. 2A, the wood laminate 202 comprises six layers, but may comprise two or more layers. Preferably, at least one of the layers is wood. Of course, other configurations may be used. Reference to "wood laminate" in this and other embodiments is by way of example only, and that term includes laminate that contains all wood, some wood, and no wood at all. The laminate layers may be of any suitable non-metal material, such as plastic, polycarbonate, fiberglass, nylon or composite material (for example, a mix of recycled wood and recycled plastic, or fiber-cement board).

The layers of the wood laminate 202 may be of any suitable dimension. For example, for roller coaster track, the layers may be 2"×8", 2"×10" or 2"×12". The layers of the wood laminate 202 may be held together by glue, epoxy, bolts, nails, screws or any other suitable adhesive or fastener.

In some embodiments, the bearing layer 204 may have a wear plate 208 attached thereto. The wear plate 208 may be made part of the bearing layer 204 by any suitable means, such as by welding or by screw or bolt 210 (e.g., a flat-head screw). A wear plate 208 may, in some embodiments, cover access holes (not shown) that may be provided in the bearing layer 204 for installing bolts for affixing the bearing layer 204 to the wood laminate 202. In some embodiments, the bearing layer 204 may be partially or wholly filled with a grout 212 that, when cured, may strengthen the tracks 200 against distortion. The grout 212 may be pumped into the interior of the bearing layer 204 after the bearing layer 204 has been fabricated and assembled into track 200. The bearing layer 204 may be provided with holes or valves through which grout 212 may be pumped. Because the bearing layer 204 may include joints, gaps or other irregularities, the grout 212 may include fine sand and/or coarser aggregate to help clog gaps and other irregularities. The grout 212 may include a plasticizer. The grout 212 may be provided as a relatively "wet" mix to allow the mix to more readily flow through the bearing layer 204. The grout 212 may, after it hardens, serve to make the bearing layer 204 more crush resistant. Of course, the term "grout" includes cement, concrete, epoxy and other compounds capable of curing into a relatively solid or illiquid material.

Figure 2B:
Figure 2C:
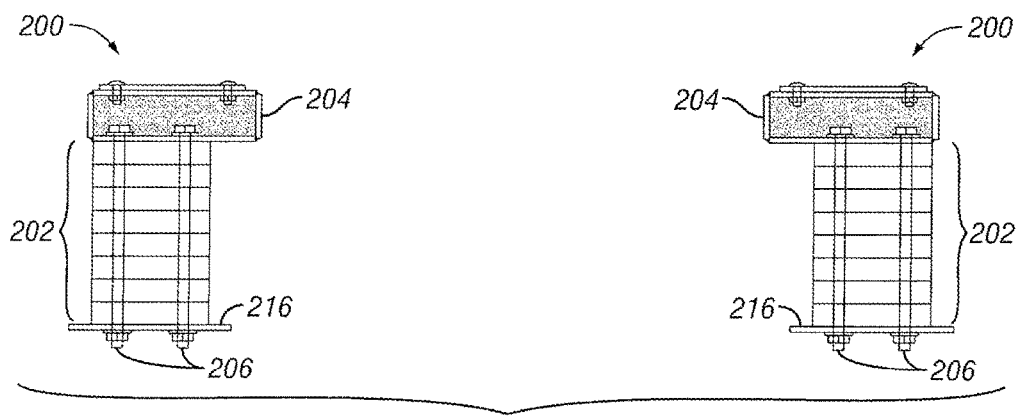

The tracks 200 may be reinforced in a variety of ways. Such reinforcement may be used, for example, for a relatively long unsupported span of track 200 under which traffic may pass. As may be seen in the embodiment of FIG. 2B, the tracks 200 may further comprise an inner plate 214 and a bottom plate 216. The inner plate 214 may be affixed to the bearing layer 204 by welding, and the bottom plate 216 may be affixed to the inner plate 214, such as by welding. Bolts 206 may be used to secure the bearing layer 204 and bottom plate 216 to the wood laminate 202. The wood laminate 202 may comprise additional layers. In the embodiment of FIG. 2C, the inner plate 214 is not used, and the bearing layer 204 and the bottom plate 216 may be affixed to the wood laminate 202 by bolts 206. In some embodiments, the layers of the wood laminate 202 may be held together by glue, and/or by the bolts 206. In some embodiments (not shown), the inner plate 214 may extend partway between the bearing layer 204 and the bottom plate 216, and may be affixed to either the bottom plate 216 or to the bearing layer 204. In yet other embodiments, an outer plate (not shown) may be used to substantially enclose the wood laminate 202, and may be used instead of an inner plate 214. An outer plate may extend may be affixed to the bearing layer 204 and the bottom plate 216, such as by welding. In some embodiments (not shown), the outer plate may extend partway between the bearing layer 204 and the bottom plate 216, and may be affixed to either the bottom plate 216 or the bearing layer 204, such as by welding. The inner plate 214, outer plate and bottom plate 216 may include perforations or designs to allow the wood laminate 202 to be partly visible through the plates.

Figure 2D:

In still further embodiments, however, the bearing layer 204 may take a variety of configurations, and may be formed accordingly. In one embodiment, the bearing layer 204 may have a width substantially equal to that of the wood laminate (not shown). In other embodiments, the bearing layer 204 may have a cross-sectional profile of one or more parallelograms, polygons or other shapes. For example, as depicted in the embodiment of FIG. 2D, the bearing layer 204 may have a cross-sectional profile of an I-beam. In the embodiments of FIGS. 2D and 2H, the top side 218 of bearing layer 204 may extend beyond one or the other of the sides 220 and 222, or beyond both. A bottom side 224 may provide flanges to allow affixation of the bearing layer 204 to the wood laminate 202, such as by bolts 206. In some embodiments, grout 212 may wholly or partially fill the bearing layer.

Figure 2E:

In the embodiment of FIG. 2E, the bearing layer 204 may have a partial I-beam cross-sectional profile comprising two parallelograms. In the embodiment of FIG. 2E, the top side 226 may extend from one side 228 past the other side 230 toward the opposite track. A bottom side 232 may complete one parallelogram formed by sides 226, 228, 230 and 232. A second parallelogram may be formed by sides 230, 226, and drop side 234 and under side 236. In some embodiments, grout 212 may wholly or partially fill the bearing layer.

Figure 2F:
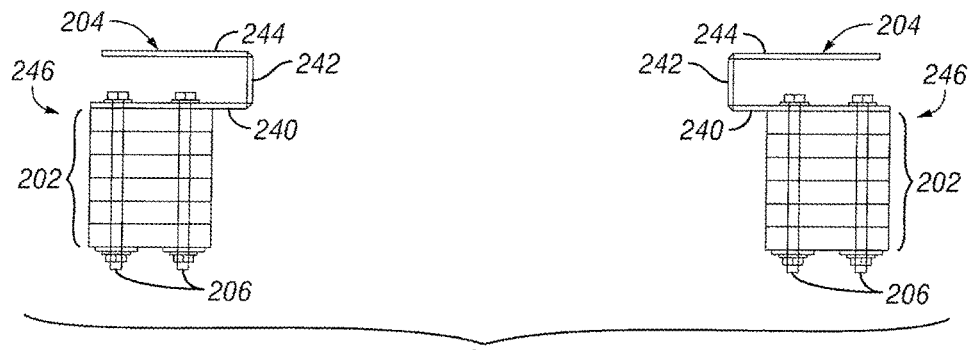
Figure 2G:
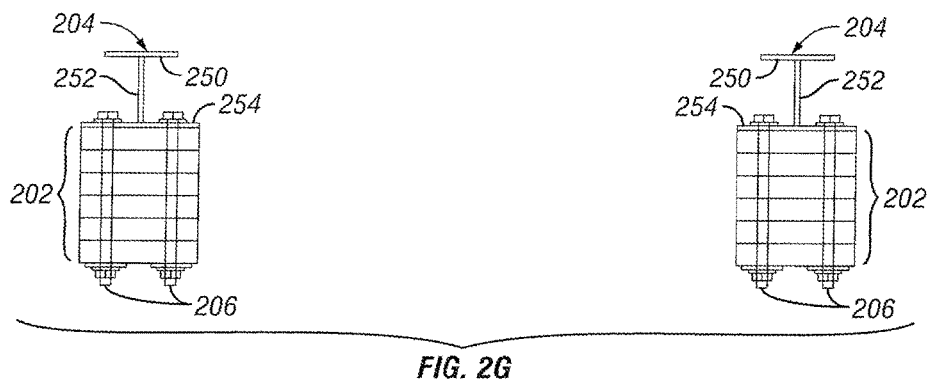
Figure 2H:
Figure 2I:
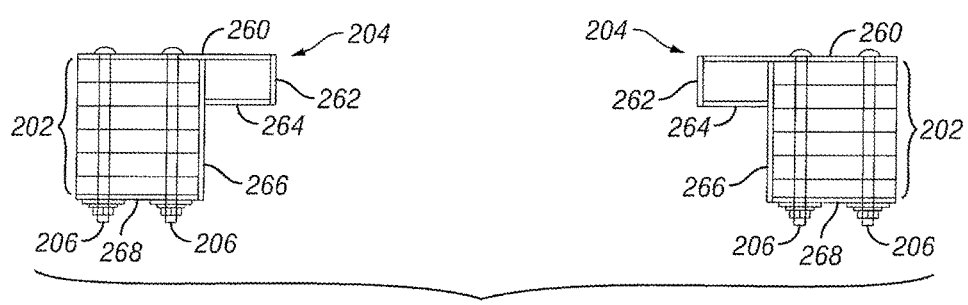

In yet another embodiment, as may be seen in FIG. 2F, the bearing layer 204 may comprise a "U" shaped cross-sectional profile. The "U" may be formed by sides 240, 242 and 244, which may comprise plates. The "U" may be left empty, or may have a strip of wood or other material (such as grout or epoxy) filling the "U" so as to reinforce the structure or create the appearance of a substantially wood roller coaster track when viewed from side 246. If wood or some other material is used to fill the "U", then the bolts 206 may extend through both sides of the "U." In yet further embodiments, as may be seen in FIG. 2G, the bearing layer 204 may comprise a different "F-shaped cross-sectional profile. The "T-shaped cross-sectional profile may comprise a first plate 250, second plate 252 and third plate 254. In still further embodiments, as may be seen in FIG. 2I, the bearing layer 204 may comprise a top plate 260, a side plate 262 and a lower plate 264. An inner plate 266 may be used to reinforce the bearing layer 204 with respect to the laminate 202. A bottom plate 268 may also be used for such embodiments. In yet further embodiments (not shown), a bearing layer may simply comprise a flat plate or strip.

Figure 3A:
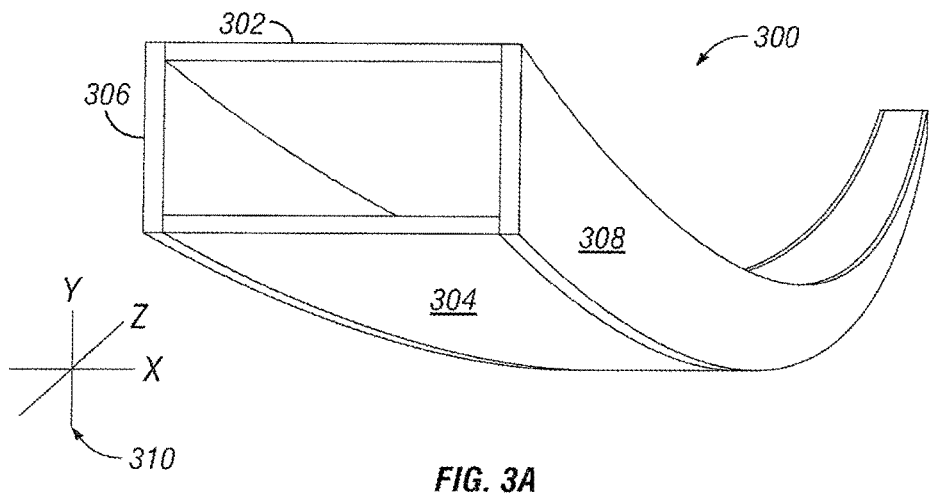
FIG. 3A-B illustrates an embodiment of a bearing layer of a roller coaster track.
Figure 3B:
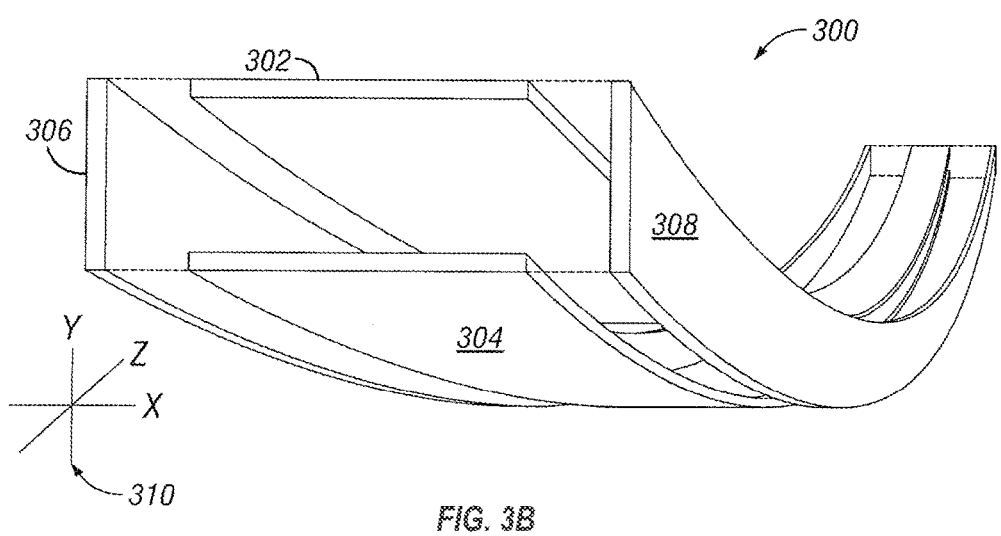

The bearing layer 204 may be constructed according to a variety of methods. In one embodiment, the bearing layer 204 may be constructed as described in co-pending Ser. No. 12/881,142, published as U.S. Pub. No. 2011/0146528 and entitled "Rolling Vehicle Track," the disclosure of which is hereby wholly incorporated by reference. In the embodiment of FIGS. 3A and 3B, for example, a bearing layer 300 may comprise a top side 302, a bottom side 304, a left side 306 and a right side 308. As assembled (FIG. 3A), the bearing layer 300 may have a cross-sectional profile comprising a rectangular parallelogram. The sides 302, 304, 306 and 308 may be permanently affixed by welding. Rather than bending a straight rectangular tube 400 (as depicted in FIG. 4A), which usually results in stress- and crack-inducing deformation (as seen in FIGS. 4B and 4C), each side 302, 304, 306 and 308 may be separately cut from planar material, such as sheet steel, and then assembled as shown in FIG. 3B to form the bearing layer 300.

Figure 4A:
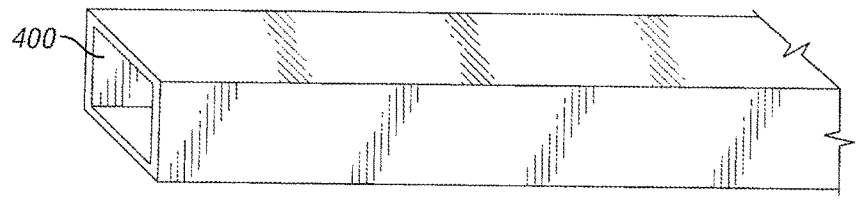
FIG. 4A-C illustrates various disadvantages of bending structural steel shapes.
Figure 4B:
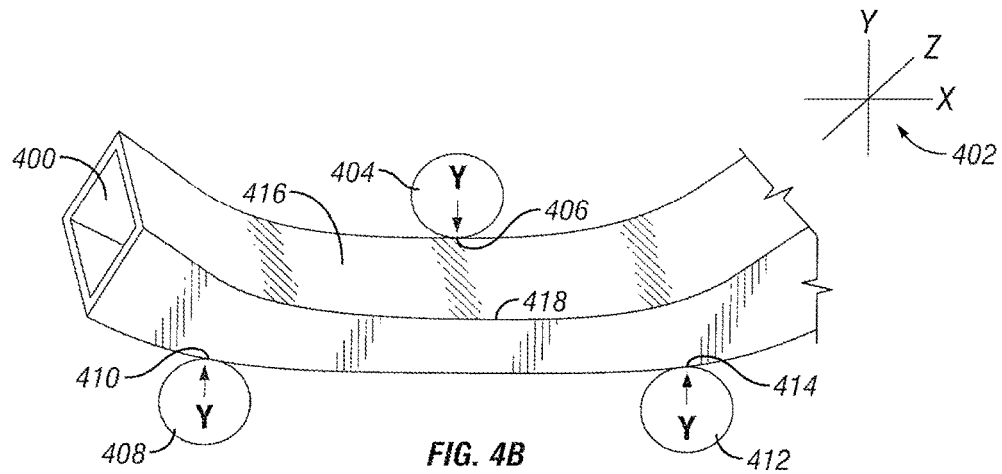

As may be seen in FIG. 4A, for example, straight rectangular tubing 400 may be a suitable material for rigid, straight structural purposes, but is difficult to bend or manipulate for curved applications, as described in the application Ser. No. 12/881,142 incorporated by reference above. As may be seen in FIG. 4B, rectangular tubing 400 may be bent in the Y dimension, as represented in the dimension representation 402. However, such bending causes a deformation in the shape of the tubing. More particularly, during such bending, rectangular tubing 400 is subjected to a downward force 404 in the Y dimension at a location 406, an upward force 408 in the Y dimension at a location 410, and an upward force 412 in the Y dimension at a location 414.

As depicted, the rectangular tubing 400 has been crushed, flattened or otherwise deformed by the forces which have compromised the cross-sectional shape of the rectangular tubing 400. More particularly, a compression force is felt at the location 406, causing the top 416 of the rectangular tubing 400 to be permanently deformed. Similarly, when visually observing an edge 418, the structural integrity of the rectangular tubing 400 can be visually confirmed by the irregular profile of the edge 418.

Figure 4C:
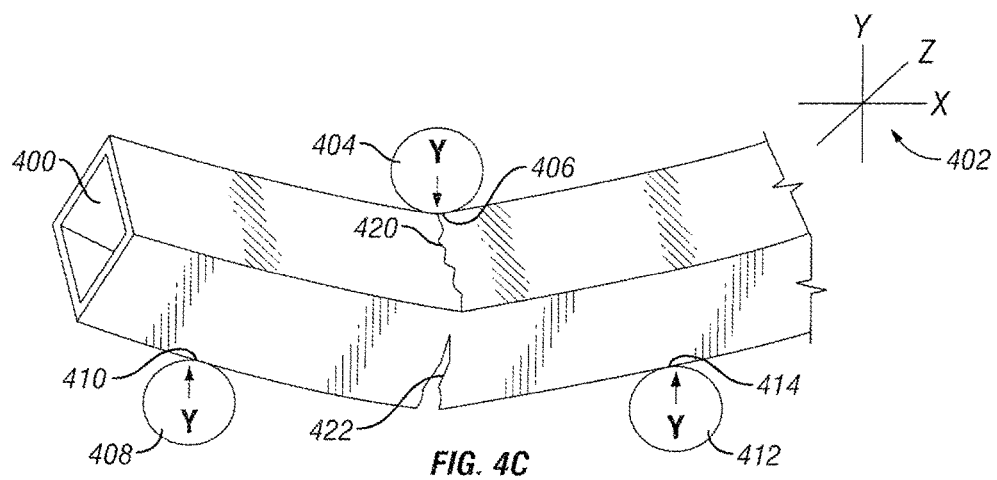

Similarly, as illustrated in FIG. 4C, bending a rectangular tube in the Y dimension may cause a failure in the integrity of the tubing. More particularly, during such bending, rectangular tubing 400 is subjected to a downward force 404 in the Y dimension at a location 406, an upward force 408 in the Y dimension at a location 410, and an upward force 412 in the Y dimension at a location 414. As can be appreciated at a location 420, the compression forces acting upon the rectangular tubing 400 may cause creases or ripples in the surface (and possibly interior) of the rectangular tubing 400. Likewise, a crack 422 may be observed in the location where expansion or stretching occurs in the material of the rectangular tubing 400. To form a bearing layer of tubing 400 in such a way would, as the tubing 400 is bent in multiple dimensions in compound curves as well as twisted, result in multiple stresses and cracks that would cause such a bearing layer to fail more quickly due to vibration and stresses as the roller coaster car travels along the tracks. Also, forming such a bearing layer in such a way would result in substantial imprecision in track dimensions, and require substantial "fitting" and field bending at the installation site in assembling the track. Similar issues arise with round tubing, I-beams, flat plate, channels and other structural members also as described in application Ser. No. 12/881,142.

With reference to FIGS. 3A and 3B, a bearing layer 300 may be designed using a three-dimensional computer aided design (CAD) system. The bearing layer 300 may be designed as part of a set of roller coaster tracks, or may be designed individually. The bearing layer 300 may include curves in various dimensions, as well as twists and straight sections. The bearing layer 300 may be designed as assembled, with each of the sides 302, 304, 306 and 308 included as separate design elements of the bearing layer design. After the bearing layer design is finalized, then the design element for each side 302, 304, 306 and 308 may be mapped to a two-dimensional plane, in a manner as described in paragraphs 34-40 and 66-68 of application Ser. No. 12/881,142, incorporated by reference above.

In the embodiment of FIGS. 3A and 3B, for example, the bearing layer 300 curves out of the X-Z plane up in the Y dimension, as represented in the dimension representation 310. Rather than bending a rectangular tube into that form, which would result in stresses and cracks as described in connection with FIGS. 4A-C, each side 302, 304, 306 and 308 may be treated separately. For the section and form of bearing layer 300 depicted, the top side 302 may be shorter than the bottom side 304. Accordingly, the design element for each of the top side and bottom side may be mapped to the X-Z plane, e.g., as if each was laid out flat in the X-Z plane. A two-dimensional pattern or shape for the top side 302 and the bottom side 304 may thus be obtained. Similarly, the design element for each of the left side 306 and right side 308 may be mapped to the Y-Z plane. Because the bearing layer of FIGS. 3A and 3B curves only in the Y dimension, mapping the design elements for the left side 306 and right side 308 to the Y-Z plane may simply involve capturing their dimensions as illustrated, because those sides are curved only in that plane. If the bearing layer 300 also curved in the X-Z plane, then the design elements for the left side 306 and right side 308 may be mapped to the Y-Z plane, e.g., as if each was laid out flat in the Y-Z plane. A two-dimensional pattern or shape for the left side 306 and the right side 308 may thus be obtained. Of course, to simplify the process, the bearing layer 300 may be conceptually divided into shorter sections long its length, and mapping done on a section-by-section basis.

After the design element for each of the sides 302, 304, 306 and 308 is mapped to a two-dimensional plane and the two-dimensional pattern for each side is obtained, each pattern may be cut from steel plate or steel bar or some other suitably durable planar material. Such cutting may be done by any suitable cutting method, such as by use of a plasma cutter, mechanical cutter, water jet, cutting torch, band saw, abrasive disc or the like. Typical materials used may include, by way of example, ¼" or ⅜" plates of A-36 steel, although other materials can be desirable in alternate configurations or applications.

After the two-dimensional patterns for each side 302, 304, 306 and 308 are cut from planar material to form the sides 302, 304, 306 and 308, the sides 302, 304, 306 and 308 may be assembled to fabricate the bearing layer 300 as designed. The bottom side 304 may, for example, be flexed or curved into the orientation specified in the bearing layer design, and held in place using jigs (such as the jig embodiment of FIG. 5). The left side 306 may be affixed to the bottom side 304, such as by welding. The top side 302 and right side 308 may thereafter be affixed to the left side 306 and bottom side 304, such as by welding.

Similarly, bearing layers having a variety of cross-sectional profiles, such as those of FIG. 2, may be conceptually designed as comprising one or more separate planar parts or sides. Each part or side may be mapped to a two-dimensional plane as described above, separately cut from planar material, and then assembled to form the bearing layer. A bearing layer comprising curves may thus be formed from planar material gently flexed into the shape of the curve and then assembled (such as by welding or fastening) with other planar material to form the bearing layer. Such gentle flexing avoids the stress and cracks caused by bending a plate, tube or other pre-formed structural member.

Fabricating a bearing layer in such a way improves the fit of the bearing layer with the wood laminate when the bearing layer and wood laminate are assembled together. That reduces the need for on-site bending and other adjustment to make track parts and sections fit together. Such fabrication also reduces stress on the track laminate, and reduces stress and tension within the bearing layer itself, as well as reduces or eliminates bending stresses and cracks.

For roller coaster embodiments, such fabrication provides for a smoother "ride" and longer track life.

Laminate may be formed in conventional ways. In some embodiments, existing laminate such as wood laminate is used, and a bearing layer affixed to the upper layer of the laminate. In other embodiments, a bearing layer may replace one or more of the upper layers of the laminate if a particular track height is required. In other embodiments, the laminate and the bearing layer may be designed together to form a new track.

To repair a track comprising laminate having a plurality of layers, for example, one or more worn out layers may be removed. Typically, the layers requiring replacing may include the layer upon which the wheels of a rolling vehicle travels, and may also include the layer immediately below that layer. Layers below those layers (the "structural layers") may often have a much longer useful life than the top wear layer(s). A bearing layer as described herein may be installed on the structural layers. The bearing layer may be configured to replace the removed layers, e.g., of the same height as the removed layers. In other embodiments, the bearing layer may simply be placed over the worn layers, thus adding to the height of the track. The bearing layer may be assembled to the laminate by any suitable means, such as bolts, screws, adhesives, brackets, pins, and the like.

Figure 5:
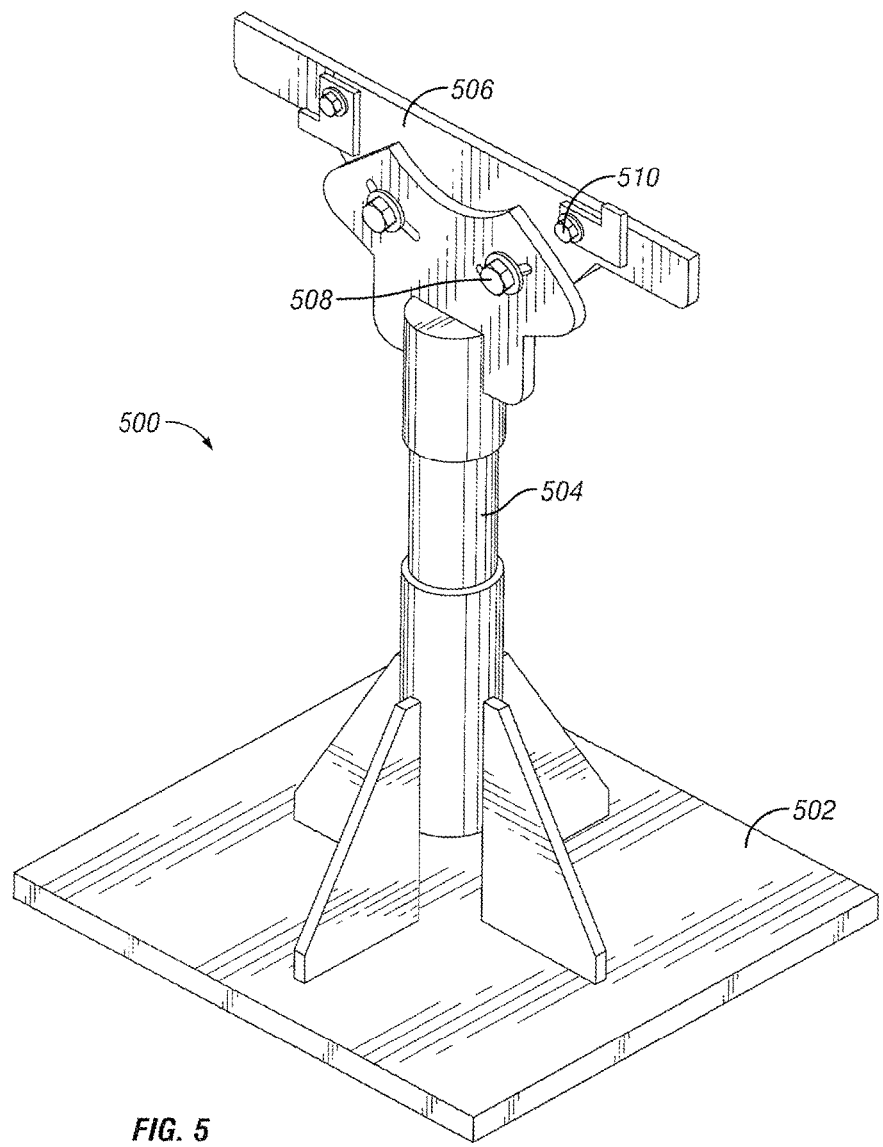
FIG. 5 illustrates an embodiment of a jig.
Figure 6:
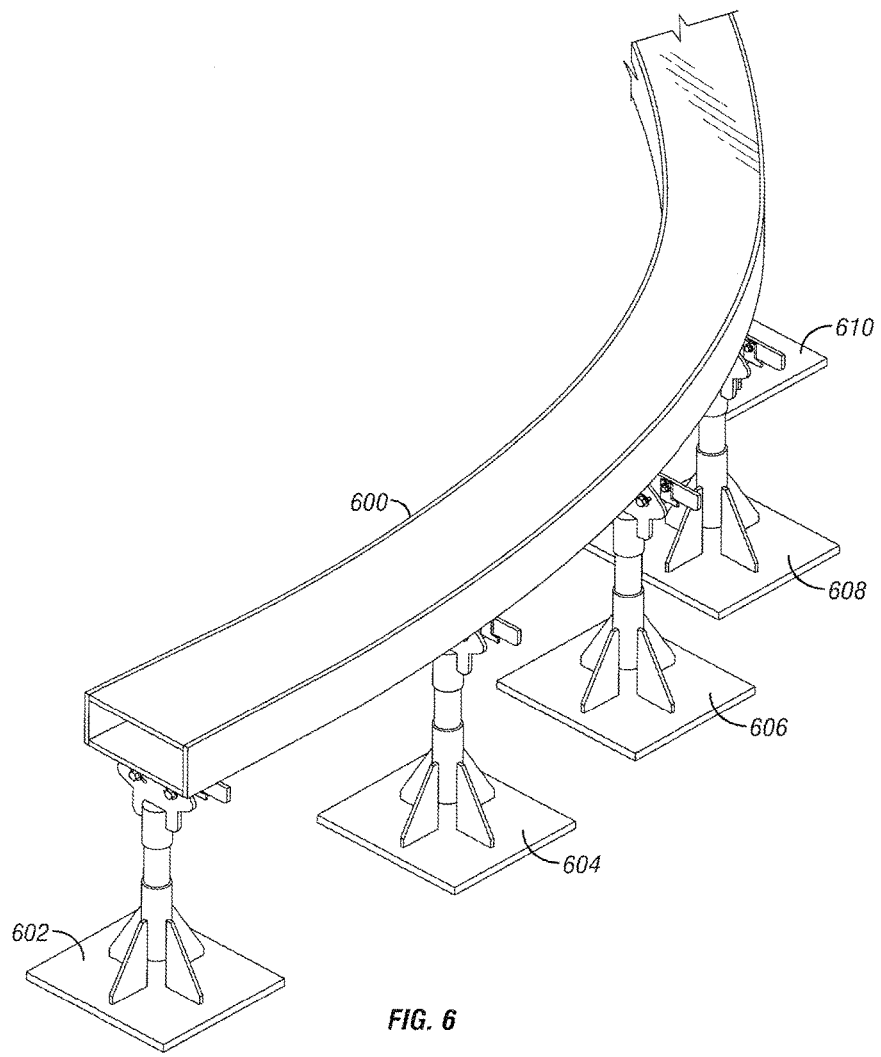
FIG. 6 illustrates using one or more of the jig embodied in FIG. 5 to support a roller coaster track or part thereof.

As may be seen in the embodiment of FIG. 5, a jig 500 may comprise a base 502, a vertical leg 504, a horizontal crossbar 506 and various adjustment mechanisms. For example, the vertical leg 504 may be configurable and of suitable design to allow the crossbeam to be placed at any desired height where the track pieces (not shown) can be positioned. Similarly, one or more bolts 508 may be provided to allow adjustment of the crossbar for orientation in a wide variety of angles to accommodate the positioning of the track pieces. One or more bolts 510 to provide a notch to hold the track pieces in a specific position upon the crossbar 506. Thus, for example, as may be seen in the embodiment of FIG. 6, a bearing layer 600 may be held in place and assembled using a plurality of jigs, namely a jig 602, a jig 604, a jig 606, a jig 608 and a jig 610.

After fabrication, the bearing layer and laminate may be assembled together, such as at the amusement park where the roller coaster is to be installed. In other embodiments, such as staircases or smaller track systems, assembly may be substantially completed at a fabrication facility and then the assembly may be moved to another location for use. If the bearing layer is provided as a replacement for one or more upper layers of the laminate, then only the bearing layer may be provided to the installation location. In other embodiments, if both the bearing layer and new laminate are to be installed, then the bearing layer and wood laminate may be assembled in sections at a fabrication facility and then transported to the installation site. That is, the methods and apparatus disclosed herein may be used for repair as well as for new fabrication of a variety of elongated curved structures, whether such structures are used for rolling vehicles, for architectural designs or otherwise.

If the bearing layer and laminate is fabricated in sections for assembly, a variety of assembly methods may be used. For example, the bearing layer and laminate may be fabricated in sections ranging from 30 to 50 feet in length. As may be seen in the embodiment of FIG. 7, an exemplary roller coaster track 700 may be spliced together. As may be seen in the cross-sectional view of FIG. 7A, the roller coaster track 700 may comprise a bearing layer 702 and wood laminate 704. The wood laminate 704 may comprise six layers. The bearing layer 702 may be affixed to the top layer 706 of the wood laminate 704 by bolts 708. A splice plate 710 may be affixed to the bottom layer 712 of the wood laminate 704 by bolts 708. The bearing layer 702 may comprise a wear plate 714.

Figures 7A, 7B:
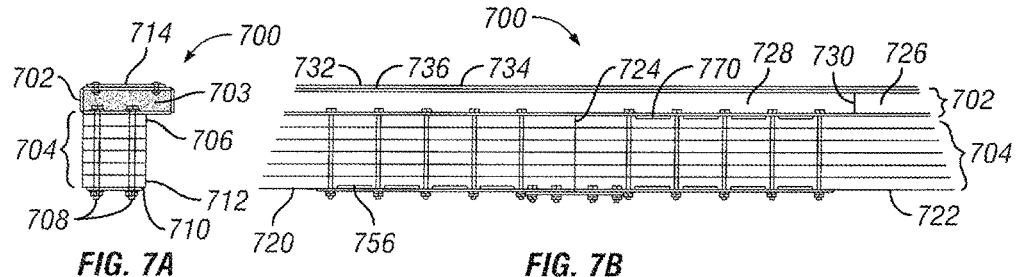
FIG. 7A-G illustrates an embodiment of a roller coaster track splice.

As may be seen in the side elevation view of FIG. 7B, two wood laminate sections 720 and 722 may be joined at splice point 724. Two bearing layer sections 726 and 728 may be joined at splice point 730. Two wear plate sections 732 and 734 may be joined at splice point 736. Thus, in some embodiments, the splice points 724, 730 and 736 may be offset. In other embodiments, the splice points 724, 730 and 736 may be aligned. That is, as may be seen in FIG. 7D, a track section 740 may comprise bearing layer section 728 and wood laminate section 720, and may in some embodiments include wear plate section 732 (bolts or adhesives joining the various sections are not shown). As seen in FIG. 7D, for offset splice points, the bearing layer 702 may extend well beyond the end of the wood laminate 704, and may join another section of track (as shown in FIG. 7B) configured to receive track section 740.

The bearing layer 702 may be spliced by abutting bearing layer sections 726 and 728 and welding them together. In other embodiments, a piece of metal, such as a section of rebar (not shown), may be welded or otherwise affixed to the interior end of bearing layer section 726 such that when the bearing layer 726 is joined to bearing layer section 728, the piece of metal extends into the interior of bearing layer section 728. Grout 703 may then be pumped into assembled bearing layer 702 and flow into bearing layer sections 726 and 728. The grout 703 may harden or cure around the piece of metal extending into bearing layer section 728, thus strengthening the splice.

Figure 7C:
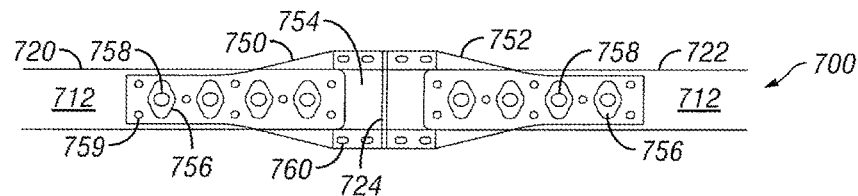
Figure 7D:
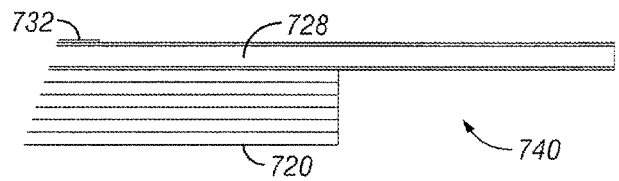
Figure 7E:
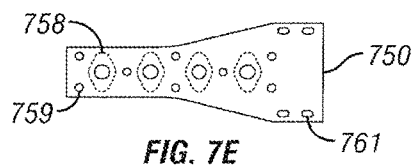
Figure 7F:
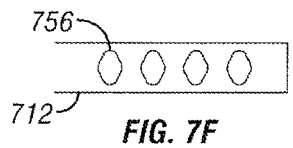
Figure 7G:
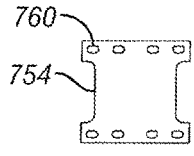

FIG. 7C illustrates a bottom view of the track 700. The wood laminate section 720 may be joined to the wood laminate section 722 at splice point 724. The bottom layer 712 of each section 720 and 722 of the wood laminate may be provided with one or more pockets 756 milled to so as to create recesses in the bottom layer 712. FIG. 7F illustrates one embodiment of one or more pockets 756 milled into the bottom layer 712 of wood laminate section 720. Splice plate section 750 may be provided with bosses 758 configured to fit into the one or more pockets of wood laminate section 720. A similar splice plate 752 may be provided for wood laminate section 722. In some embodiments, the bosses 758 may fit relatively snugly into the pockets. In other embodiments, the bosses 758 may fit relatively loosely into the pockets, and any void therebetween filled with epoxy. Splice plate 750 may include one or more holes 759 and 761 configured to receive bolts or screws. FIG. 7E illustrates one embodiment of a splice plate 750 for wood laminate section 720.

As may be further seen in the embodiment of FIG. 7C, a joint plate 754 may be provided for joining the splice plates 750 and 752. As may be further seen in the embodiment of FIG. 7G, the joint plate may include holes 760 corresponding to holes 761 of the splice plate (as in FIG. 7E) to allow the splice plates 750 and 752 to be bolted, screwed or otherwise joined to the joint plate 754. Of course, such joinder may be by welding or clamping or other suitable mechanism. The splice plates 750 and 752 and joint plate 754 may be made of any suitable material, such as wood, metal, plastic or fiberglass.

Also, milled pockets 770 may be provide in the upper layer 706 of the corresponding wood laminate section 722. Milled pockets 770 may be filled with epoxy to better bind the bearing layer 728 to the wood laminate 722. The bearing layer 728 may, in some embodiments, include bosses (not shown) that extend into the milled pockets. In some embodiments, the bosses may fit relatively snugly into the pockets. In other embodiments, the bosses may fit relatively loosely into the pockets, and any void therebetween filled with epoxy.

Figure 8:
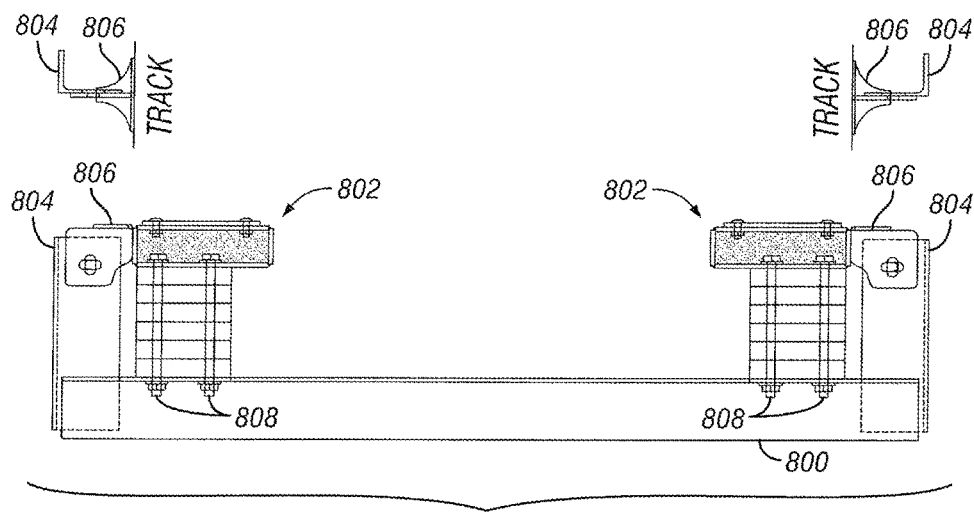
FIG. 8 illustrates an embodiment of ties for installing roller coaster track.
Figure 9A:
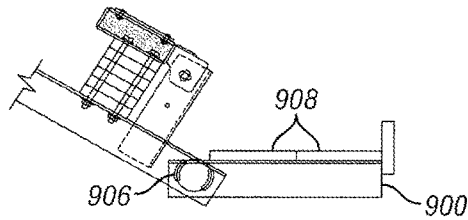
FIG. 9A-D illustrates various embodiments of catwalk.
Figure 9B:
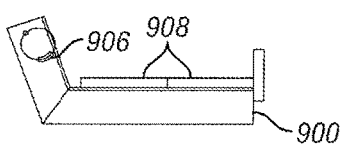
Figure 9C:
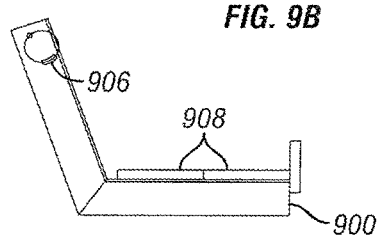
Figure 9D:
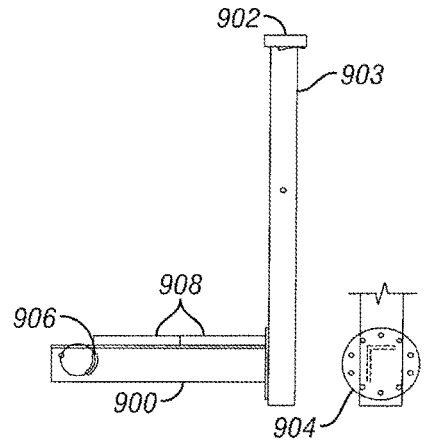
Figure 11E:
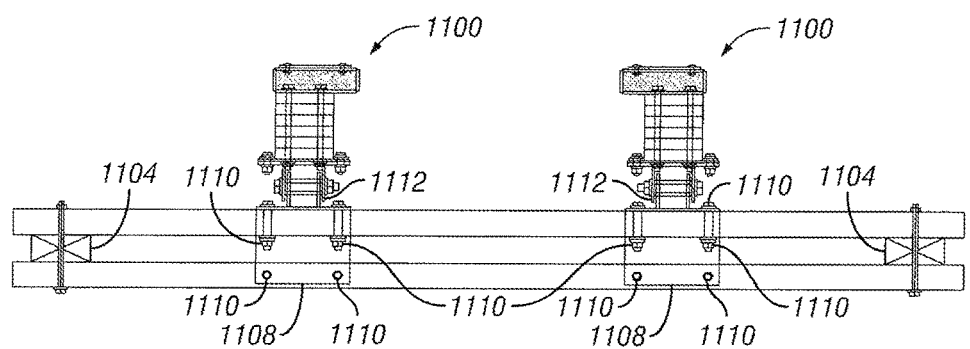
Figure 11F:
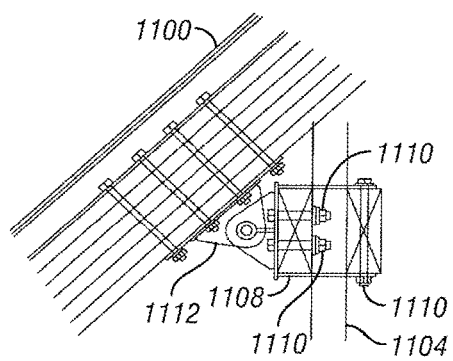
Figure 11G:
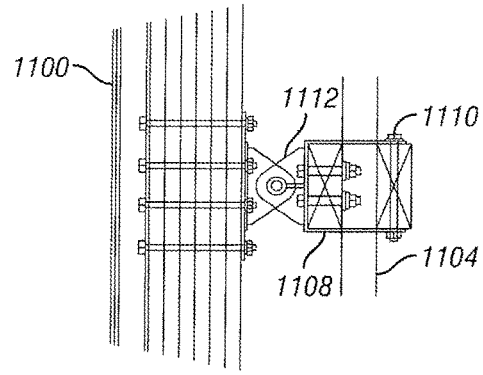
Figure 11H:
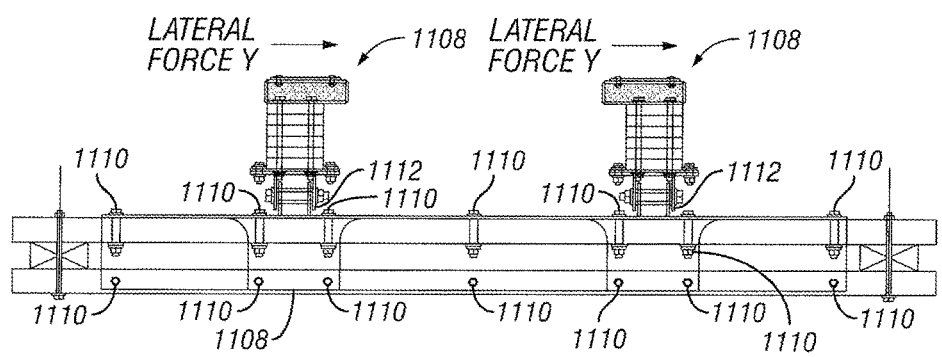

Track made according to the methods disclosed herein may be installed in a variety of ways. In roller coaster track embodiments, for example, track 802 may be mounted to one or more steel ties 800, as shown in the embodiment of FIG. 8. The steel tie 800 may comprise flanges 804 extending therefrom for stabilizing the track 802. Gusseted ears 806 may be mounted to the flanges 804 to provide an interface between the flanges 804 and track 802. The ears 806 may be mounted to the flanges 804 using welding, bolts (not shown) or any other suitable fastener. The track 802 may be welded to the ears 806. The track 802 may be mounted to the ties 800 using bolts 808 or any other suitable fastener. The ties 800 and flanges 804 may comprise, for example, angle steel.

Catwalks may be provided along various sections of the track, as well. As shown in the embodiments of FIG. 9, catwalks 900 may be configured in a variety of ways, depending on track angle and safety requirements. For example, the catwalk 900 of FIG. 9A may be used for track oriented in the angle range of 0°-60°. The catwalk 900 of FIG. 9B may be used for track oriented in the angle range of 0°-60°. The catwalk 900 of FIG. 9C may be used for track oriented in the angle range of 75°-90°. In some embodiments, a handrail 902 may be provided. The handrail 902 may be mounted to an index plate 904 to allow mounting at a variety of angles. A handrail post 903 may be configured to receive a cable for safety. Slots 906 may be provided to allow for adjustment of catwalk angle. Boards 908, expanded metal or any other suitable surface may be provided to support a human on the catwalk 900.

For sections of track installed relatively close to the ground, for example, the track 1000 may be mounted to one or more concrete pillars 1002, as shown in the embodiment of FIG. 10. A post 1004 may support the track 1000 on the pillars 1002. Various adaptor and mounting plates 1006, 1008 and 1010 may be provided to secure the track 1000 to the post 1004 and the post 1004 to the pillars 1002.

In other embodiments, track 1100 may be mounted to one or more wood ledgers 1102, as in various views of the example of FIG. 11. The ledger 1002 may be supported by one or more legs 1104. The ledgers 1002 may comprise, for example, two parallel 4"×12" wood beams 1106. One or more channel plates 1108 may be used to mount the track 1100 to top or bottom of the ledger 1102 using bolts 1110 or any other suitable fastener. A pivotable bracket 1112 may be mounted to each channel plate 1108 to allow mounting of the track 1100 to the ledger 1102 at a variety of angles. The pivotable bracket 1112 may include a slotted index 1114 plate to allow further orientation of the track 1100 with respect to the ledger 1102. Of course, the track 1100 may also be mounted to the side of the ledger 1102, as may be seen in the embodiment of FIGS. 11E-11G. In still further embodiments, as in the example, of FIG. 11H, a single channel plate 1108 may be used for relatively high g-force applications to strengthen attachment of the tracks 1100 to the ledger 1102, e.g. so as to reduce track canting. In some embodiments, a single channel plate 1108 may comprise a full plate on one side, and smaller plates on the other side. In higher g-force applications, such as when a roller coaster travels along a track 1100 configured into a tight curve, a single channel plate 1108 may better resist increased lateral forces Y on the track.

Figure 12:
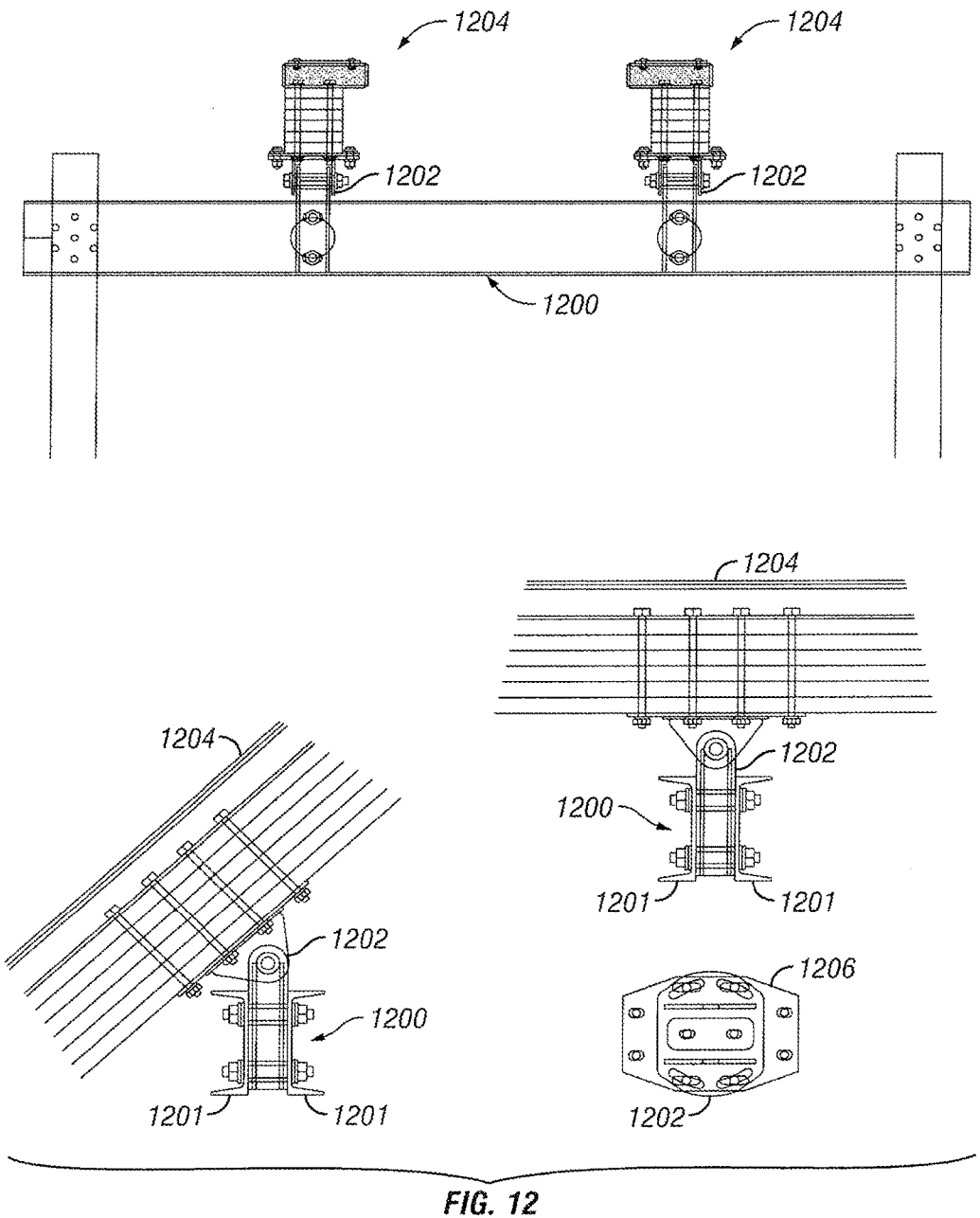
FIG. 12 illustrates yet another embodiment of ties for installing roller coaster track.
Figure 12:
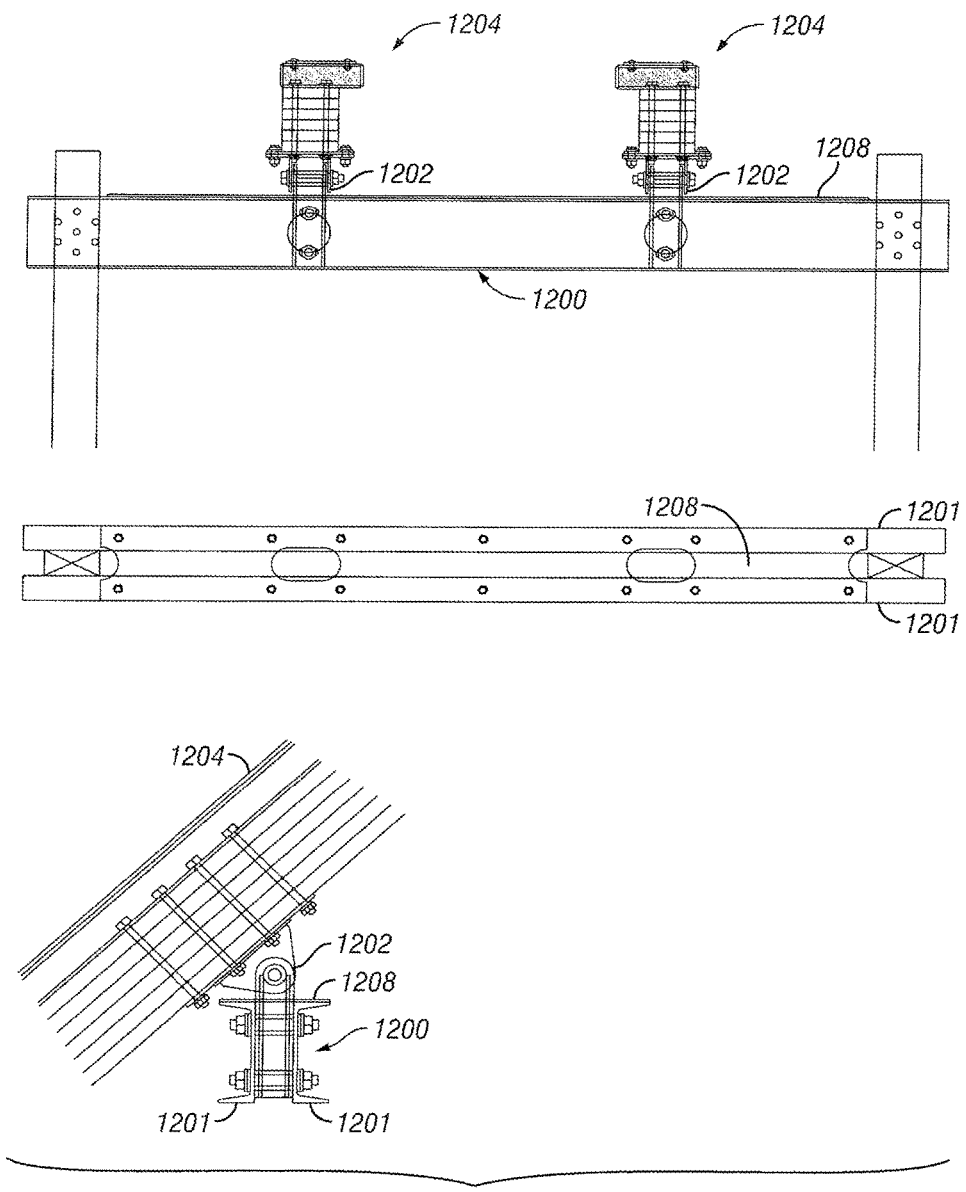

In other embodiments, a ledger 1200 may comprise one or more steel channels 1200, as in various views of the example of FIG. 12. A pivotable bracket 1202 may be mounted to each ledger 1200 to allow mounting of the track 1204 to the ledger 1200 at a variety of angles. The pivotable bracket 1202 may include a slotted index plate 1206 to allow further orientation of the track 1204 with respect to the ledger 1200. In some embodiments, a ledger plate 1208 may be used to join two channels.

Figure 13A:
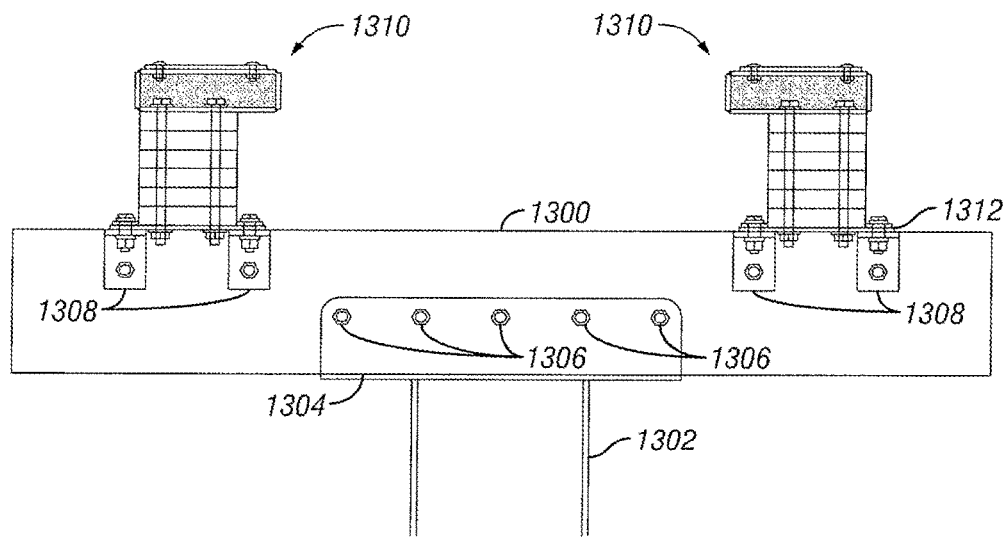
FIG. 13A-B illustrates yet another embodiment of ties for installing roller coaster track.
Figure 13B:
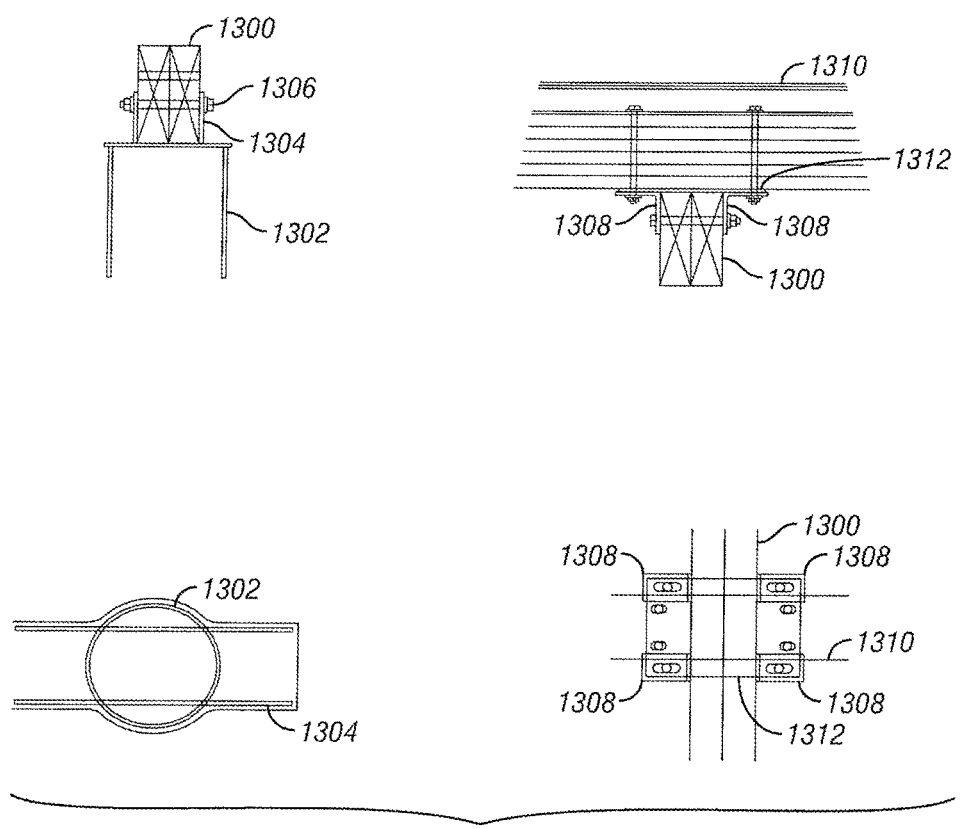

In still further embodiments, a ledger 1300 may be mounted to a post 1302, such as a steel post, as may be seen in various views of the example of FIG. 13. The ledger 1300 may be mounted in a channel 1304 welded or otherwise affixed to the post. Bolts 1306 or other suitable fasteners may immovably hold the ledger 1300 in the channel 1304. Angle brackets 1308 may be used to mount the track 1310 to the ledger 1300. A track plate 1312 may provide a wider base for the track 1310 to rest upon.

Although the present apparatuses and methods and their advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

We claim:

1. A method of manufacturing a section of roller coaster track, the method comprising the steps of:

creating a design of a curve of the roller coaster track section comprising a laminate and a bearing layer, the bearing layer comprising metal, the bearing layer further comprising a cross-section substantially in a shape of a first parallelogram, the first parallelogram comprising a first side, a second side, a third side and a fourth side, the design comprising a first design element corresponding to the first side, a second design element corresponding to the second side, a third design element corresponding to the third side, and a fourth design element corresponding to the fourth side;

for each of the first design element, the second design element, the third design element and the fourth design element:

determining a planar shape of the side, the planar shape of the side corresponding to such design element as laid flat, and cutting planar material into a form of the planar shape of the side so as to form the side; and assembling the cut planar material corresponding to each of the design elements to form the bearing layer substantially according to the design;

laminating at least two strips of non-metal material together to form the laminate substantially according to the design; and assembling the laminate and the bearing layer to form the curve of the roller coaster track section.

2. A method of splicing at least two roller coaster track sections, the method comprising the steps of:

manufacturing a first section of roller coaster track according to the method of claim 1, wherein the laminate of the first section is a first laminate and the bearing layer of the first section is a first bearing layer, wherein the first laminate and the first bearing layer each have a first end and a second end, and are assembled such that the first end of the first bearing layer extends beyond the first end of the first laminate by a first length;

manufacturing a second section of roller coaster track according to the method of claim 1, wherein the laminate of the second section is a second laminate and the bearing layer of the second section is a second bearing layer, wherein the second laminate and the second bearing layer each have a first end and a second end, and the second laminate and the second bearing layer are assembled such that the second end of the second laminate extends beyond the second end of the second bearing layer by a second length, the first length being substantially equal to the second length; and assembling the first section of roller coaster track with the second section of roller coaster track such that the first end of the first bearing layer substantially abuts the second end of the second bearing layer to create a bearing layer splice, and the first end of the first laminate substantially abuts the second end of the second laminate to create a laminate splice, the resulting bearing layer splice and the resulting laminate splice being offset.

3. The method of claim 2 further comprising the steps of:

prior to the step of assembling the first section of roller coaster track with the second section of roller coaster track, welding a first end of a piece of metal to an interior of the first end of the first bearing layer such that a second end of the piece of metal extends beyond the first end of the first bearing layer; and assembling the first section of roller coaster track with the second section of roller coaster track such that the second end of the piece of metal extends into an interior of the second end of the second bearing layer.

4. The method of claim 3, further comprising at least partially filling the first bearing layer and the second bearing layer with grout.

\* \* \* \* \*